(12) United States Patent
Jahnke

(10) Patent No.: US 7,484,525 B2
(45) Date of Patent: Feb. 3, 2009

(54) RESETTABLE FAILED NOZZLE RELIEF VALVE

(75) Inventor: Russell C. Jahnke, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 567 days.

(21) Appl. No.: 11/337,117

(22) Filed: Jan. 20, 2006

(65) Prior Publication Data

US 2007/0228308 A1   Oct. 4, 2007

(51) Int. Cl.
*E21B 33/06* (2006.01)
*F16K 15/00* (2006.01)
*B65B 1/04* (2006.01)

(52) U.S. Cl. .................. 137/467; 251/1.1; 141/198; 141/350

(58) Field of Classification Search .............. 141/192, 141/198, 206, 350; 220/86.2; 251/1.1; 29/888.4; 137/467
See application file for complete search history.

(56) References Cited

U.S. PATENT DOCUMENTS

| | | | | |
|---|---|---|---|---|
| 4,044,913 A | * | 8/1977 | Brunnert | 220/86.2 |
| 4,924,923 A | * | 5/1990 | Boehmer et al. | 141/312 |
| 5,732,840 A | * | 3/1998 | Foltz | 220/86.2 |
| 6,691,750 B1 | * | 2/2004 | Foltz | 141/350 |
| 7,055,557 B1 | * | 6/2006 | Jahnke et al. | 141/59 |
| 7,415,997 B2 | * | 8/2008 | Cisternino et al. | 141/368 |
| 2005/0126657 A1 | * | 6/2005 | Allman et al. | 141/286 |
| 2007/0000574 A1 | * | 1/2007 | DeCapua et al. | 141/350 |
| 2007/0169845 A1 | * | 7/2007 | Benjey et al. | 141/350 |

* cited by examiner

*Primary Examiner*—Timothy L Maust
*Assistant Examiner*—Jason K Niesz
(74) *Attorney, Agent, or Firm*—Anna M. Shih

(57) ABSTRACT

A failed nozzle relief (FNR) valve has a resetting mechanism that resets the valve when a filler cap is replaced over the filler cup. The FNR valve has an annular seal that surrounds a filler neck opening. The annular seal seats against a ring having at least one aperture that creates an alternative fluid flow path. During a failed nozzle shutoff condition, the annular seal separates from the ring, opening the aperture to allow fluid to flow through it. The FNR valve also has a reset lever that is pressed downward when the filler cap is replaced, thereby forcing the seal back against the ring.

18 Claims, 2 Drawing Sheets

RESETTABLE FAILED NOZZLE RELIEF VALVE

TECHNICAL FIELD

The present invention relates to valves responsive to a fuel nozzle shutoff failure, and more particularly to a valve that is disposed in a filler neck of a fuel system for a vehicle.

BACKGROUND OF THE INVENTION

Fuel vapor recirculation tubes are used in motor vehicle fuel tank filler tubes to recirculate fuel vapor during refueling from a nozzle inserted in the filler tube with a mechanical seal provided about the nozzle. The recirculated vapor provides a make-up flow below the nozzle seal to prevent the flow discharging from the nozzle from creating a vacuum in the filler tube and prematurely activating the automatic nozzle shutoff.

If the filler nozzle is working properly, the automatic nozzle shutoff mechanism will operate when the fuel tank is full. However, if the mechanism is not working properly, fuel is allowed to back up the filler tube and spill out to prompt the operator to manually shut off the nozzle.

Fuel systems typically have a "failed nozzle relief" (FNR) mechanism to protect the system from damage when it is overfilled. If the system includes a sealing member that seals against the filler nozzle to reduce vapor generation during refueling, the FNR mechanism provides an alternative flow path if the nozzle fails to shut off. This flow path is normally protected by a valve or a sealing membrane. However, the FNR mechanism needs to be reset and repositioned to a normal operating state after the failed nozzle event to close off the alternative flow path for the next normal refueling event. Resetting devices increase the complexity of the FNR mechanism and may also cause increased fuel tank pressures or fuel discharge at higher than accepted pressures.

There is a desire for a resettable FNR mechanism having a simple design and that can be easily reset by the operator.

BRIEF SUMMARY OF THE INVENTION

The present invention is directed to a FNR valve having a resetting mechanism that resets the valve when a filler cap is replaced over the filler cup. In one embodiment, the valve has an annular seal that surrounds a filler neck opening. The annular seal seats against a bottom portion having a ring with at least one aperture that creates an alternative fluid flow path. During a failed nozzle shutoff condition, the annular seal separates from the ring, opening the aperture to allow fluid to flow through it.

The FNR valve also has a reset lever that extends into a top portion of the valve. When the FNR valve opens, the reset lever moves further upward into the upper portion into a space normally occupied by a filler cap. When the operator replaces the cap over the filler cup and screws it downward, the filler cap presses downward against the reset lever to move the seal back against the ring and close the aperture.

DETAILED DESCRIPTION OF THE INVENTION

Figure 1:
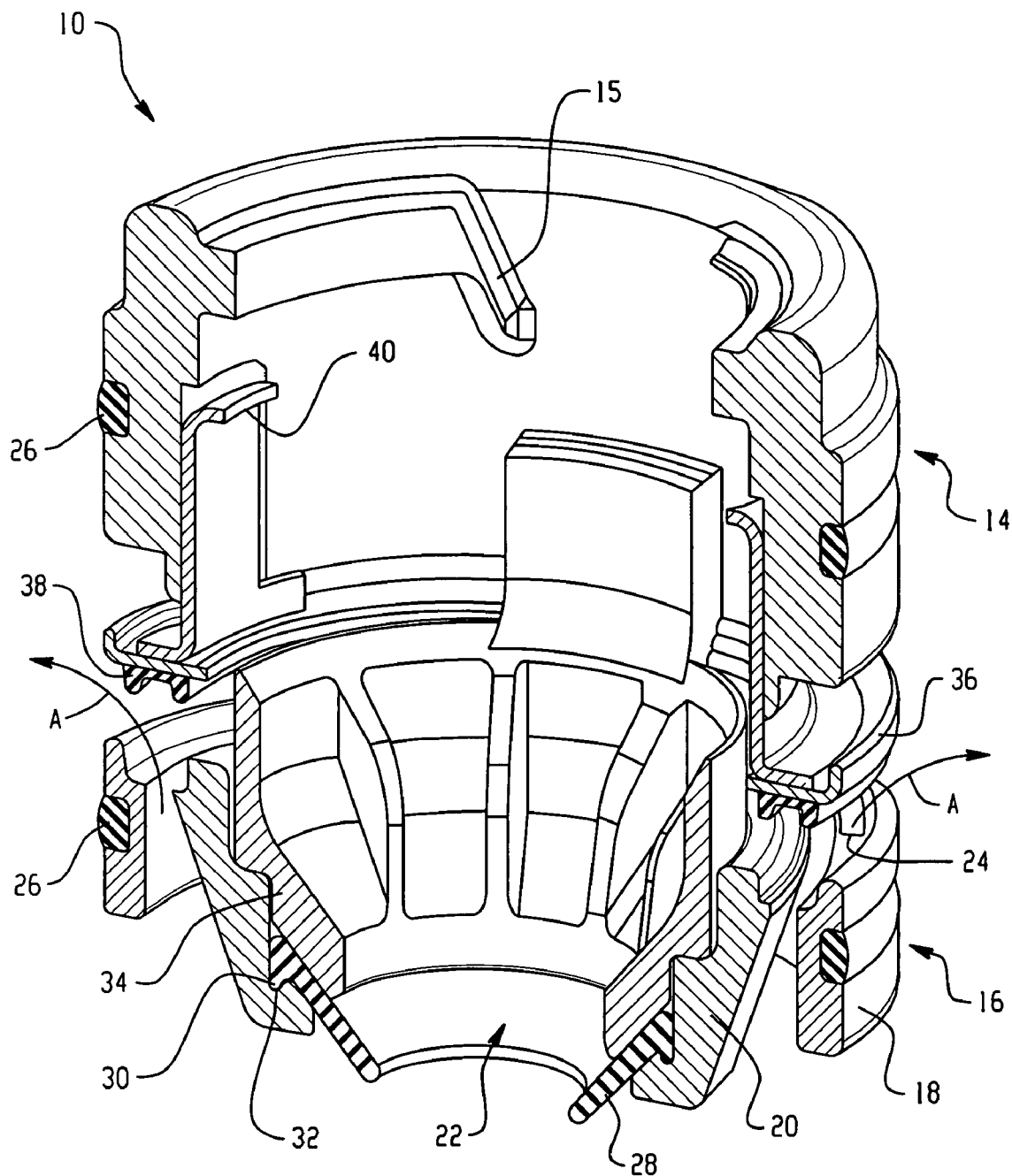
FIG. 1 is a perspective section view of a valve according to one embodiment of the invention in a closed position.
Figure 2:
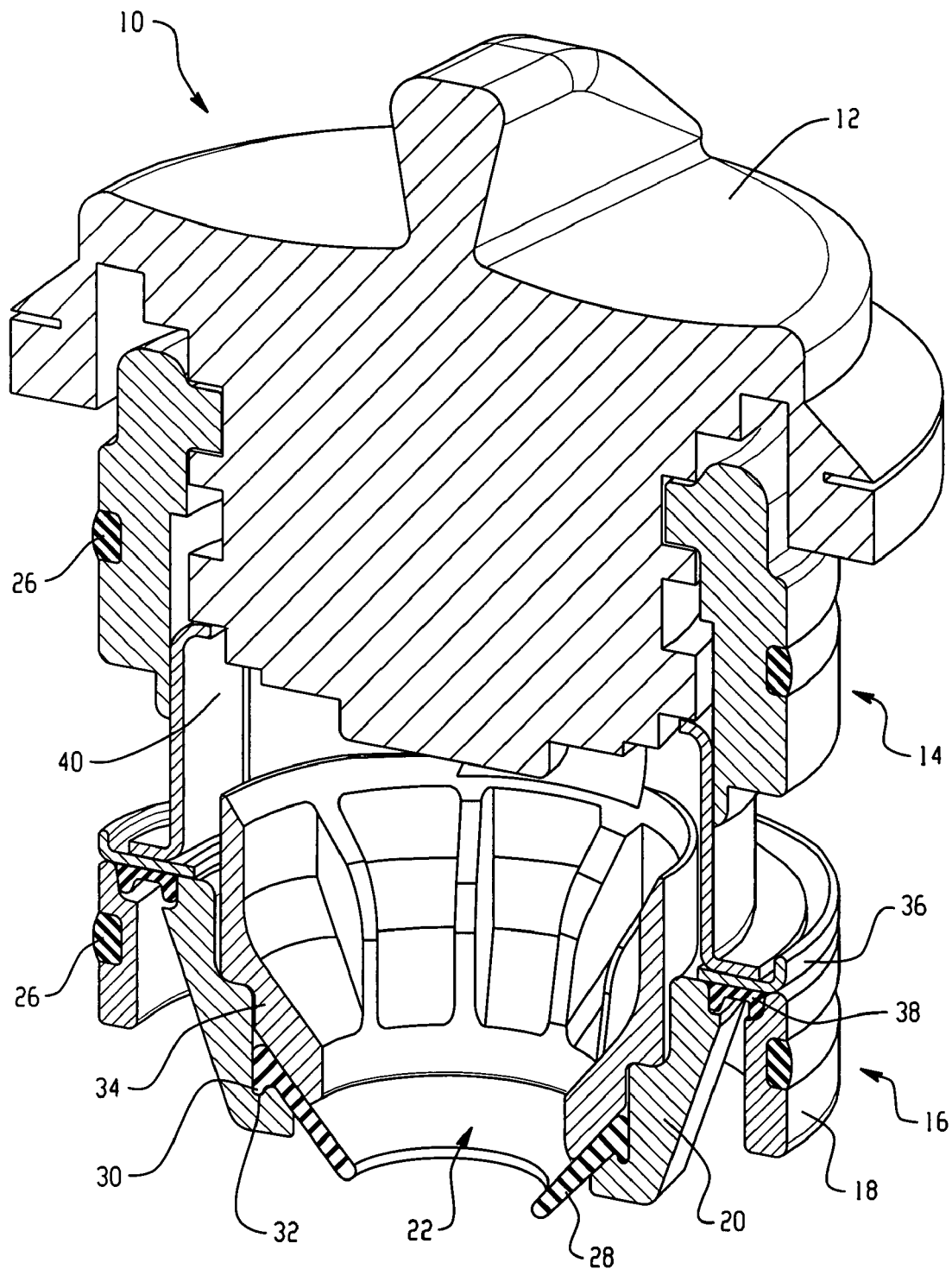
FIG. 2 is a perspective section view of the valve in FIG. 1 in an open position.

FIG. 1 is a perspective cutaway view of a failed nozzle relief (FNR) valve 10 in an open position after a nozzle failure has occurred, while FIG. 2 shows the FNR valve 10 in a normal, closed position with a filler cap 12 attached to it. The FNR valve 10 has a top portion 14 having a filler cap engagement area 15 that is threaded to be engageable with the filler cap 12. The FNR valve 10 also has a bottom portion 16 with a ring 18 and a semi-conical center portion 20 having a bore 22 that can accommodate a filler nozzle (not shown). The ring 18 has one or more apertures 24 that create an alternative fluid flow path, as shown by the arrows A in FIG. 1, when the valve 10 is open.

One or more seals 26, such as O-rings, are disposed on either the top portion 14, the bottom portion 16, or both so that the valve 10 can sealingly engage with the inner wall of a filler tube (not shown) in a spaced relationship. A nozzle seal 28 may be disposed in the center portion 20 to seal against the filler nozzle and form a mechanical seal. In one embodiment, the nozzle seal 28 is held in place via a lip 30 on the seal 28 that engages with a ridge 32 in the center portion 20. A semi-conical insert 34 may be placed against the center portion 20 so that the nozzle seal 28 is held between the center portion 20 and the insert 34.

An FNR ring 36 is disposed between the top and bottom portions 14, 16 of the valve 10. The FNR ring 36 is movable between an open position (FIG. 1) and a closed position (FIG. 2) and acts as a poppet that opens and closes the apertures 24 on the bottom portion 16. The FNR ring 36 has an annular seal 38 configured to engage with the ring 18 on the bottom portion 16 and seal off the apertures 24. A reset lever 40 is attached to the FNR ring 36 and extends into the top portion 14 of the valve 10.

As shown in FIG. 1, fluid pressure from a failed nozzle condition will cause the FNR ring 36 to move upward, opening the apertures 24 and creating an alternative fluid flow path. In one embodiment, fluid flowing through the apertures 24 will flow up and out the filler tube, notifying the operator to manually shut off the nozzle. When the FNR ring 36 is in the open position, the reset lever 40 extends into the filler cap engagement area 15, which is normally occupied by the filler cap 12 when the fuel tank is not being refilled.

Once refueling is complete, the alternative fluid path provided by the apertures 24 is no longer needed. Replacing the filler cap 12 onto the top portion 14 of the valve 10 as shown in FIG. 2 and screwing it downward pushes the reset lever 40 downward as well. This downward movement forces the FNR ring 36 and its associated seal 38 back against the ring 18 of the bottom portion 16, sealing off the apertures 24 and thereby closing off the alternative fluid flow path. As a result, the valve 10 is reset after a failed nozzle condition without requiring any additional action by the operator.

By creating a failed nozzle relief valve with a resetting lever that is engageable with the filler cap, the valve is easily resettable at the same time the filler cap is replaced. The inventive valve therefore provides a simple way to create an alternative fluid path in a failed nozzle condition without increasing the likelihood of elevated fuel tank pressures or fuel discharge at higher than accepted pressures. Note that although the above description describes discrete components, it is possible to incorporate multiple components into a single component and/or separate the components in different ways without departing from the scope of the invention.

Although the invention has hereinabove been described with respect to the illustrated embodiments, it will be understood that the invention is capable of modification and variation and is limited only by the following claims.

What is claimed is:

1. A failed nozzle relief (FNR) valve for a vehicle fuel system, comprising:

a top portion having a filler cap engagement area;

a bottom portion having at least one aperture forming a fluid flow path;

an FNR portion disposed between the top portion and the bottom portion, wherein the FNR portion is movable between a closed position that closes said at least one aperture during normal refueling and an open position to open said at least one aperture during a failed nozzle condition; and a reset lever attached to the FNR portion, wherein the reset lever extends into the filler cap engagement area when the FNR portion is in the open position.

2. The valve of claim 1, wherein the filler cap engagement area is threaded to engage with a filler cap.

3. The valve of claim 1, wherein the bottom portion includes a plurality of apertures to form the fluid flow path.

4. The valve of claim 1, further comprising a seal on the FNR portion that engages with the bottom portion to close said at least one aperture.

5. The valve of claim 1, further comprising a nozzle seal disposed in the bottom portion, wherein the nozzle seal engages with a fuel nozzle to form a mechanical seal.

6. The valve of claim 5, wherein the bottom portion further comprises a center portion having a bore, and wherein the nozzle seal is attached to the center portion.

7. The valve of claim 6, further comprising an insert disposed in the bottom portion, wherein the nozzle seal is disposed between the center portion of the bottom portion and the insert.

8. The valve of claim 1, further comprising at least one seal disposed on an outer surface of at least one of the top portion and the bottom portion to sealingly engage with a filler tube.

9. A failed nozzle relief (FNR) valve for a vehicle fuel system, comprising:

a top portion having a filler cap engagement area;

a bottom portion having a plurality of apertures forming an alternative fluid flow path during a failed nozzle condition, wherein the top portion and the bottom portion are adapted to engage with an inner wall of a filler tube;

a nozzle seal disposed in the bottom portion, wherein the nozzle seal engages with a fuel nozzle to form a mechanical seal;

an FNR ring disposed between the top portion and the bottom portion, wherein the FNR ring is movable between a closed position that closes said at least one aperture during normal refueling and an open position to open said at least one aperture during a failed nozzle condition;

a seal disposed on the FNR ring, wherein the seal engages with the bottom portion to close the plurality of apertures during normal refueling; and a reset lever attached to the FNR ring, wherein the reset lever extends into the filler cap engagement area when the FNR is in the open position.

10. The valve of claim 9, wherein the filler cap engagement area is threaded to engage with a filler cap.

11. The valve of claim 9, wherein the bottom portion further comprises a center portion having a bore, and wherein the nozzle seal is attached to the center portion.

12. The valve of claim 11, further comprising an insert disposed in the bottom portion, wherein the nozzle seal is disposed between the center portion of the bottom portion and the insert.

13. The valve of claim 9, further comprising at least one seal disposed on an outer surface of at least one of the top portion and the bottom portion to sealingly engage with the inner wall of the filler tube.

14. A method of making a failed nozzle relief (FNR) valve for a vehicle fuel system, comprising:

forming a top portion having a filler cap engagement area;

forming a bottom portion having at least one aperture forming a fluid flow path;

forming an FNR ring and disposing the FNR ring between the top portion and the bottom portion such that the FNR ring is movable between a closed position that closes said at least one aperture during normal refueling and an open position to open said at least one aperture during a failed nozzle condition;

attaching a seal on the FNR ring; and attaching a reset lever to the FNR ring such that the reset lever extends into the filler cap engagement area when the FNR is in the open position.

15. The method of claim 14, further comprising placing a nozzle seal disposed in the bottom portion, wherein the nozzle seal engages with a fuel nozzle to form a mechanical seal.

16. The method of claim 15, wherein the bottom portion further comprises a center portion having a bore, and wherein the step of placing the nozzle seal comprises attaching the nozzle seal to the center portion.

17. The method of claim 16, further comprising an insert disposed in the bottom portion, wherein the nozzle seal is disposed between the center portion of the bottom portion and the insert.

18. The method of claim 14, further comprising disposing at least one seal dispose on an outer surface of at least one of the top portion and the bottom portion to sealingly engage with a filler tube.

* * * * *